(12) United States Patent
Ahmed et al.

(10) Patent No.: US 11,402,229 B2
(45) Date of Patent: Aug. 2, 2022

(54) ENHANCED LOCATION-BASED NAVIGATION FOR PEDESTRIANS AND PUBLIC TRANSPORTATION USERS

(71) Applicant: JPMorgan Chase Bank, N.A., New York, NY (US)

(72) Inventors: Raja Ahmed, Larchmont, NY (US); Melvin Lopez, Brooklyn, NY (US); Christine Mossiah, New York, NY (US); Florencia Salinas-Comuzzi, New York, NY (US); Nathan Bender, Riverview, FL (US); Varun Bharadwaj, Glasgow (GB); Sahil Sethi, New Brunswick, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 495 days.

(21) Appl. No.: 16/442,667

(22) Filed: Jun. 17, 2019

(65) Prior Publication Data
US 2020/0393266 A1     Dec. 17, 2020

(51) Int. Cl.
| | |
|---|---|
| *G06Q 20/12* | (2012.01) |
| *G01L 13/02* | (2006.01) |
| *G01C 21/20* | (2006.01) |
| *G01C 21/36* | (2006.01) |
| *G10L 13/02* | (2013.01) |
| *G09B 21/00* | (2006.01) |

(52) U.S. Cl.
CPC ......... *G01C 21/3629* (2013.01); *G01C 21/20* (2013.01); *G06Q 20/12* (2013.01); *G10L 13/02* (2013.01); *G09B 21/006* (2013.01); *G09B 21/009* (2013.01)

(58) Field of Classification Search
CPC .... G01C 21/3629; G01C 21/20; G06Q 20/12; G10L 13/02; G09B 21/006; G09B 21/009
See application file for complete search history.

(56) References Cited

U.S. PATENT DOCUMENTS

| | | | |
|---|---|---|---|
| 2020/0309557 A1* | 10/2020 | Efland | G01C 21/3626 |
| 2020/0393266 A1* | 12/2020 | Ahmed | G09B 21/008 |
| 2021/0160605 A1* | 5/2021 | Igarashi | G01S 15/06 |

* cited by examiner

*Primary Examiner* — Mathew Franklin Gordon
(74) *Attorney, Agent, or Firm* — Greenblum & Bernstein P.L.C.

(57) ABSTRACT

Systems and methods for providing a navigation system for impaired travelers. The system includes a traveler device having a navigation application stored thereon. The navigation application is configured to receive route information, via the traveler device. The navigation application further identifies a route and a location of a location module along the route. The navigation application further determines a delivery means based on an additional selection, wherein the delivery means includes at least one accommodation associated with the additional selection. The navigation application also generates an accommodation means based on the route and the additional selection, wherein the accommodation means defines a path along the route. Additionally, the navigation application provides the accommodation means for navigation guidance along the path via the delivery means.

20 Claims, 5 Drawing Sheets

ENHANCED LOCATION-BASED NAVIGATION FOR PEDESTRIANS AND PUBLIC TRANSPORTATION USERS

TECHNICAL FIELD

The present disclosure relates generally to location-based navigation systems and methods of using the same.

BACKGROUND

Traditional location-based tracking and mapping technologies use longitude and latitude coordinates, e.g., via standard printed maps or other signage, to guide pedestrians along streets and other travelers using private or public transportation. Traditional guidance does not consider the pedestrian or traveler's travel context, e.g., what accommodations the traveler requires along their route, what modes of transportation the traveler would utilize on the route, or how many stops or streets remain before the traveler arrives at their destination. Although these traditional technologies may provide sufficient guidance to move about a location for most individuals, individuals with impairments, e.g., hearing or visual impairments, are typically provided little or no assistance using these traditional technologies. For example, individuals with a visual impairment traveling via mass transportation may have difficulty viewing or interpreting particular signage in bus or subway stations due to low level accuracy. Listening to announcements, e.g., on a subway, may not be viable for the hearing-impaired. Both hearing and visually impaired travelers may need to depend on riders who are not impaired for assistance, thereby, minimizing their personal freedom to move about a location with confidence.

Accordingly, a need exists for a complete, accurate and enhanced navigation system capable of providing navigation assistance to all travelers, impaired or otherwise, which can provide each traveler the ability to independently and confidently travel along a route within an area to the traveler's destination.

SUMMARY

These and other objects, features, and advantages of the present disclosure will become apparent from the following detailed description of illustrative embodiments thereof, which is to be read in connection with the accompanying drawings.

In an exemplary embodiment, a method for navigating for a traveler with an impairment is provided. The method includes receiving route information, via a traveler device, wherein the route information includes a first location, a destination, and an additional selection corresponding to the impairment. The method also includes identifying a route and a location of a location module along the route. The method further includes determining a delivery means based on the additional selection, wherein the delivery means includes at least one accommodation associated with the additional selection. Additionally, the method includes generating an accommodation means based on the route and the additional selection, wherein the accommodation means defines a path along the route, and wherein the path includes the location of the location module. The method also includes providing the accommodation means for navigation guidance along the path via the delivery means.

In yet a further exemplary embodiment, a location-based navigation system for an impaired individual is provided. The system includes a computer readable memory having a plurality of instructions for a navigation application stored thereon. The system also includes a processor in communication with the computer readable memory and configured to execute the plurality of instructions, via a traveler device, to perform operations. The operations include receiving route information, via a traveler device in communication with the processor, wherein the route information includes a first location, a destination, and an additional selection corresponding to the impairment. The operations also include identifying a route and a location of a location module along the route. The operations further include determining a delivery means based on the additional selection, wherein the delivery means includes at least one accommodation associated with the additional selection. Additionally, the operations include generating an accommodation means based on the route and the additional selection, wherein the accommodation means defines a path along the route, and wherein the path includes the location of the location module. The operations also include providing the accommodation means for navigation guidance along the path via the delivery means.

In another exemplary embodiment, a non-transitory computer readable medium comprising executable instructions for causing at least one computer processor to perform the following operation is provided. The executable instructions may include instructions for receiving route information, via a traveler device, wherein the route information includes a first location, a destination, and an additional selection corresponding to the impairment. The executable instructions may also include instructions for identifying a route and a location of a location module along the route. The executable instructions may further include instructions for determining a delivery means based on the additional selection, wherein the delivery means includes at least one accommodation associated with the additional selection. Additionally, the executable instructions may include instructions for generating an accommodation means based on the route and the additional selection, wherein the accommodation means defines a path along the route, and wherein the path includes the location of the location module. The executable instructions may also include instructions for providing the accommodation means for navigation guidance along the path via the delivery means.

BRIEF DESCRIPTION OF THE DRAWINGS

These and other features of the present disclosure will become better understood with regard to the following description and accompanying drawings in which.

DETAILED DESCRIPTION

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

In general, the computing systems and devices described herein may be assembled by a number of computing components and circuitry such as, for example, one or more processors (e.g., Intel®, AMD®, Samsung®) in communication with memory or other storage medium. The memory may be Random Access Memory (RAM), flashable or non-flashable Read Only Memory (ROM), hard disk drives, flash drives, or any other types of memory known to persons of ordinary skill in the art and having storing capabilities. The computing systems and devices may also utilize distributed cloud computing technologies to facilitate several functions, e.g., storage capabilities, executing program instruction, etc. The computing systems and devices may further include one or more communication components such as, for example, one or more network interface cards (NIC) or device having analogous functionality, one or more one way or multi-directional ports (e.g., bi-directional auxiliary port, universal serial bus (USB) port, etc.), in addition to other hardware and software necessary to implement wired communication with other devices. The communication components may further include wireless transmitters, a receiver (or an integrated transceiver) that may be coupled to broadcasting hardware of the sorts to implement wireless communication within the system, for example, an infrared transceiver, Bluetooth transceiver, or any other wireless communication known to persons of ordinary skill in the art and useful for facilitating the transfer of information.

Figure 1:
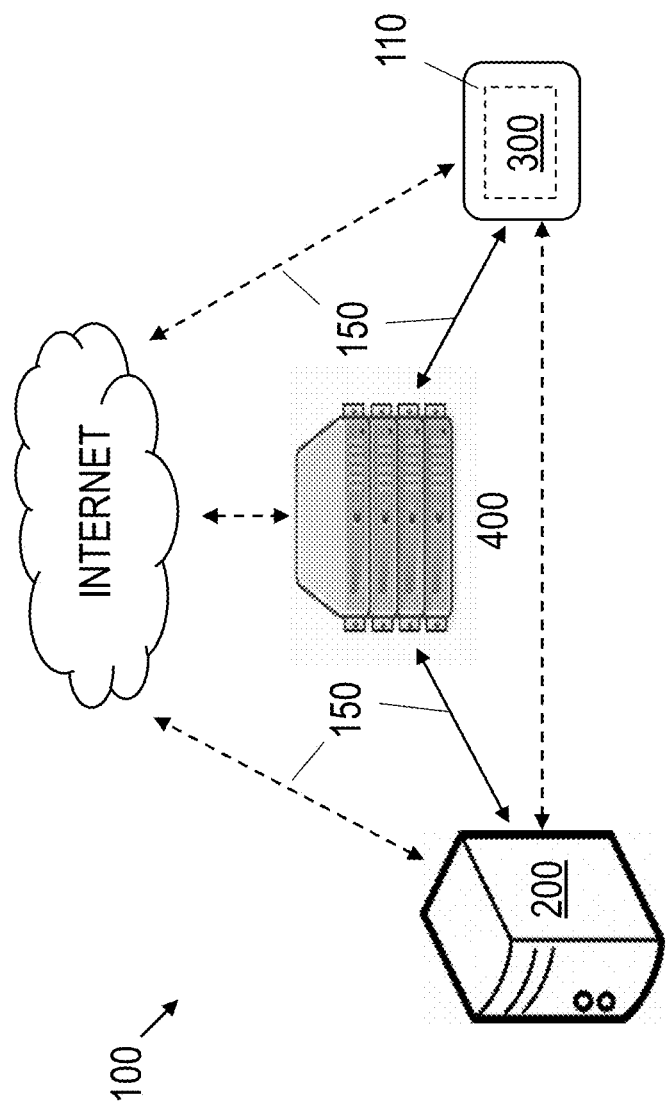
FIG. 1 illustrates an exemplary embodiment of a system in accordance with the disclosure provided herein.

Referring now to the drawings, which are for purposes of illustrating exemplary embodiments of the subject matter herein only and not for limiting the same, FIG. 1 shows an exemplary embodiment of a location-based navigation system 100 for travelers using third party (public or private) transportation.

As shown in FIG. 1, the location-based navigation system 100 may include at least an administrator control system 200 in operable communication with a user control system 300, which may be provided or otherwise executed via a traveler device 110, and a central data repository system (also referred to as data repository) 400 via a communication link 150 (as shown). The communication link 150 may be a direct communication link, a remote communications link, and/or any communication link known to persons of ordinary skill in the art and configurable to allow for communication and/or interfacing between the devices and/or components of the location-based navigation system 100. Examples of such communication links 150 may include Local Area Networks (LAN), Wide Area Networks (WAN), and Global Area Networks (GAN) having wire or wireless branches, including, e.g., the Internet (as shown). Additionally, network devices/components and/or nodes (e.g., cabling, routers, switches, gateway, etc.) may also be included in the location-based navigation system 100 for facilitating the transfer of information, e.g., location information, within the location-based navigation system 100, and between at least the administrator control system 200, the user control system 300, and the data repository 400.

The user control system 300 may be included in software and/or hardware (e.g., in a controller or mobile device, e.g., a phone, tablet or wearable electronic device), and may be configured to interface or otherwise communicate with various devices, modules, and/or systems within the location-based navigation system 100, e.g., the administrator control system 200 and/or data repository 400. In an exemplary embodiment where the user control system 300 includes hardware, the user control system 300 may include at least a processor in signal communication with a memory, a network interface device, and a storage component/device. The processor may be operable to execute a plurality of instructions from a navigation application, which may be stored in the memory or other storage medium accessible via the navigation application or the traveler device 110. It should be appreciated that the above hardware components of the user control system 300 may be one or more components of the traveler device 110. In some embodiments, the navigation application may include a plurality of instructions to facilitate the transmission of location information, e.g., via navigation metadata, between the traveler device 110 and one or more devices, modules, or systems of the location-based navigation system 100, e.g., the administrator control system 200 and/or the data repository 400.

The administrator control system 200 may be software and/or hardware and may be included in a controller or server in communication with various devices, modules, or systems within the location-based navigation system 100. In an exemplary embodiment where the administrator control system 200 is software, the administrator control system 200 may reside in a memory or other storage medium, and may include a control application having a plurality of executable instructions for facilitating the transmission of the location-based data to one or more devices, modules, or systems within the location-based navigation system 100, e.g., the traveler device 110, the user control system 200, and/or data repository 400. Additionally, or alternatively, hardware configurations of the administrator control system 200 may include at least a processor in signal communication with at least a memory, a network interface device, and a storage component. The processor may be operable to execute the plurality of instruction of the control application, e.g., stored in memory, for providing location information associated with a managed area 212 (as shown in FIGS. 2A-2C) and/or one or more paths 214 (as shown in FIGS. 2A-2B) corresponding to one or more routes presented to a traveler 204.

With continued reference to the figures, the data repository 400 may be configured to interface or otherwise communicate with one or more of the systems, devices, or modules within the location-based navigation system 100 (e.g., the administrator control system 200, the traveler device 110, or the user control system 300) for receiving or otherwise accessing information (e.g., metadata) associated with one or more locations, e.g., location modules 210 or paths 214, within a managed area 212. In some embodiments, the received information may also correspond to the traveler's 204 previous and/or ongoing travel, e.g., along the path 214 within the managed area 212. It should be appreciated that the previous travel information may be accessed via the data repository as historical data for the traveler 204.

In yet a further exemplary embodiment, the data repository 400 may be managed, and/or governed by a municipality or similar governing body, which may maintain the location-based data for its public transportation, e.g., above and below ground location-based data, waterway data, and/or underground floorplan etc., within its control. It should be appreciated that the location-based data may be encrypted or similarly secured such that unauthorized manipulation of the location-based data may be restricted, while remaining accessible to the traveler 204, e.g., via the traveler device 110.

Figure 2A:
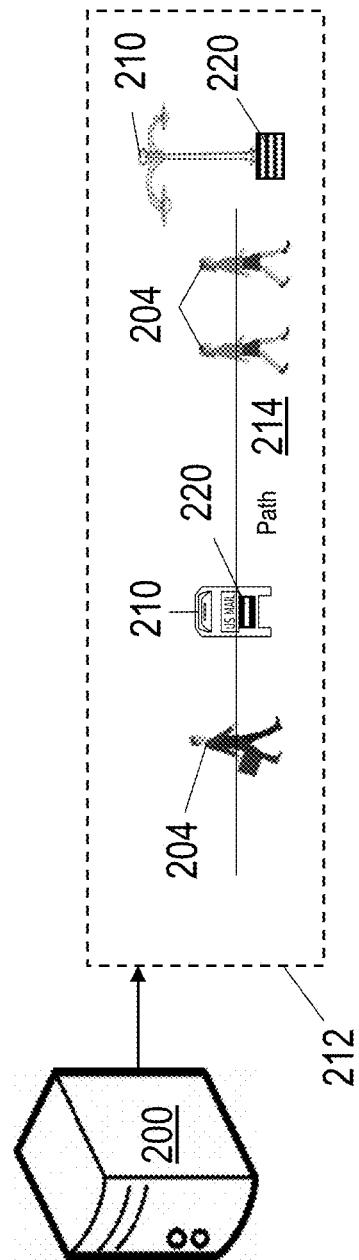
FIG. 2A illustrates an exemplary embodiment of an administrator control system in accordance with the disclosure provided herein.
Figure 2B:
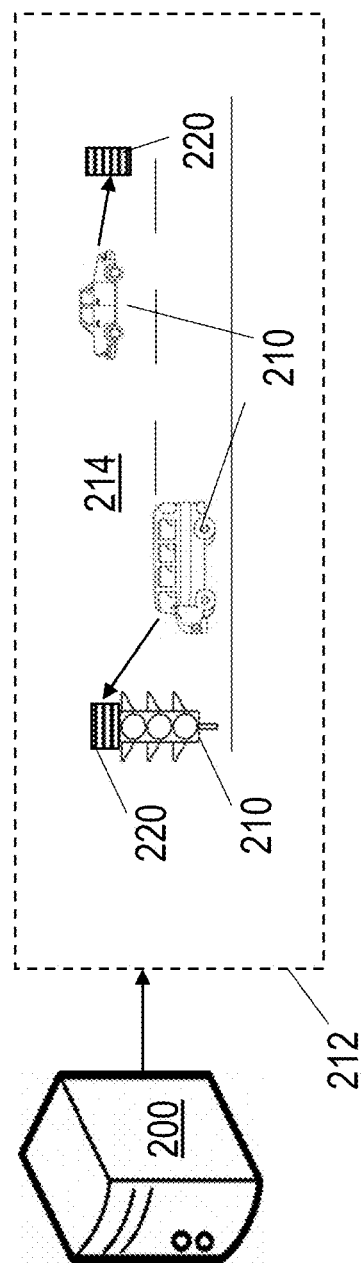
FIG. 2B illustrates another exemplary embodiment of an administrator control system in accordance with the disclosure provided herein.
Figure 2C:
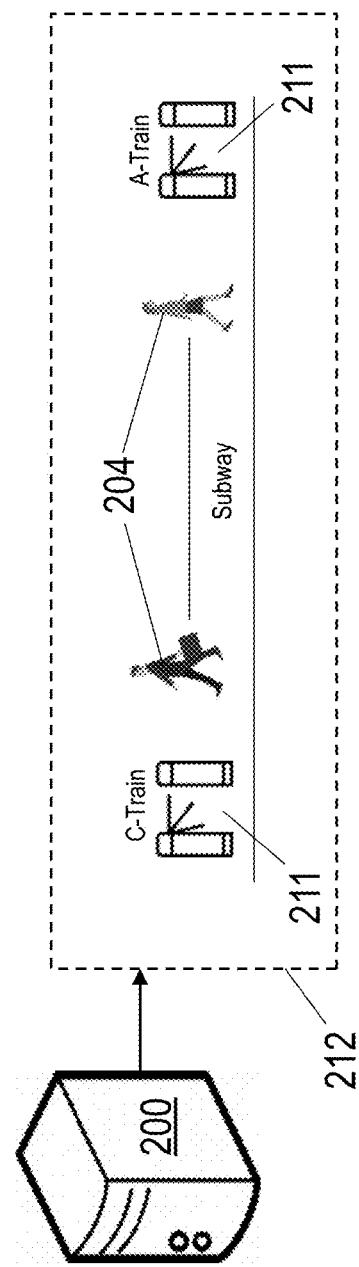
FIG. 2C illustrates a further exemplary embodiment of an administrator control system in accordance with the disclosure provided herein.

With continued reference to the figures, and more particularly to FIG. 2A, FIG. 2B, and FIG. 2C, embodiments of the traveler 204 interfacing with the administrator control system 200 are provided. It should be appreciated that the traveler 204 may be any individual moving about an area or along a path 214. For example, in the exemplary embodiment illustrated in FIG. 2A, the traveler 204 may be a pedestrian walking along the path 214. Additionally, or alternatively, as illustrated in the exemplary embodiment of FIG. 2B, the traveler 204 may travel along the path 214 using a motor vehicle, e.g., a bus and/or other form of private and/or public transportation. In some embodiments, as illustrated in the exemplary embodiment of FIG. 2C, the private and/or public transportation may include transportation by a railway system, for example, a subway train.

In some embodiments, the traveler 204 may utilize the traveler device 110 along the path 214 to interact with one or more location modules 210 and/or one or more tagging systems 220, e.g., via a navigation application, for providing location information associated with the traveler 204, e.g., via the location module 210.

The tagging system 220 may be included with the location module 210, or in some embodiments, may be an independent system operable to transmit or otherwise communicate information (e.g., navigation metadata) corresponding to the location module 210 and/or the traveler 204. The navigation metadata may include information corresponding to the traveler's location and preferences as identified or otherwise provided by a traveler 204, e.g., via a user interface of the navigation application.

The tagging system 220 may be operably configured to provide additional location information associated with the location module 210, and/or information corresponding to the traveler's 204 location once the traveler 204 interfaces with the tagging system 220, e.g., via the traveler device 110, and along the path 214 within the managed area 212.

Additionally, or alternatively, the location information (or additional information) for the location module 210, and/or any physical object having a location module 210 or tagging system 220 selectively attached thereto, may be coded to the tagging system 200 such that interfacing with the tagging system 220 may provide the location information to the traveler 204, via the traveler device 110. The coding may be in the form of indicia or a similar identifier accessible and/or identifiable to the traveler device 110. In one exemplary embodiment, the indicia or similar identifier may be a barcode (e.g., a QR Code). The QR code may be used with a mapping application system and/or any additional location-based data, e.g., from either WAN, GAN, and/or GPS, to provide precise location information to and for the traveler 204 in real-time or near real-time. It should be appreciated that the mapping application system may be included in any system of the location based navigation system 100, e.g., the administrator control system 200.

In operation, e.g., the location information may be transmitted to the traveler device 110, e.g., through a scan of the tagging system 220 via the mapping application system. The mapping application system may provide or be defaulted to provide the traveler's 204 current location, e.g., via GPS and/or Wi-Fi, as the traveler's context. The travel context may be provided in near real-time as the traveler 204 scans along their travel path 214. Identification of the travel context may also be achieved via scanning the tagging system 220. It should be appreciated that providing the travel context in near-real time may provide highly accurate location-based information beyond prior art systems. Additionally, or alternatively, if the traveler 204 alters their transportation or travel along the path 214 without updating and/or otherwise notifying the mapping application system, the mapping application system may be configured to automatically and dynamically update the traveler position, e.g., based on one or more subsequent scans, which may not have been included in path 214 of the originally requested trip. Dynamic updates like this may occur, e.g., if the traveler 204 decides to get on a bus after the traveler 204 initially elected walking as the selected mode of travel. Once the traveler 204 scans the indicia or similar identifier on the bus, the mapping application system may update the path 214 being traveled to now include the bus, and any other identifiers or location modules 210 along the updated path 214.

Additionally, or alternatively, the location module 210 may be configured and/or administered by a central administrative authority, e.g., the Department of Transportation or similar transit authority, whose role may include maintaining the location module 210, including updating any metadata, maps, schedules, floorplans, and/or other location information corresponding to the location module 210 and/or the managed physical location.

Additionally, or alternatively, any information associated with the location module 210 may be stored in a database or similar storage medium where the location module 210 may be provided, e.g., at wheelchair accessible locations, in bathrooms, and/or at underground newsstands.

Additionally, or alternatively, the tagging system 220 may be configured to provide the traveler's 204 location as a function of time, e.g., upon interfacing with the traveler device 110. Location as a function of time may be used to determine one or more previous or current locations for the traveler 204, the direction of travel for the traveler 204, and/or the speed or pace at which the traveler 204 may be moving along the path 214 and/or within the managed area 212.

Additionally, or alternatively, the tagging system 220 may provide location information, e.g., additional location information, about the location module 210 and/or the traveler 204 through tagging system's 220 metadata, which may be transmitted from the tagging system 220 to, e.g., the administrator control system 200 and/or the data repository 400. It should be appreciated that transmission of tagging system's 220 metadata to any of the systems, devices, or modules described herein may be facilitated via the data repository 400. For example, metadata may be submitted first to the data repository 400, and then provided to the other systems, e.g., administrator control system 200 and/or user control system 300, via the data repository 400 for facilitating the transmission of the location information.

Additionally, or alternatively, the data repository 400 may be operably configured to maintain the metadata, identifier (e.g., indicia), and/or similar location information for one or more of the location modules 210 and/or one or more tagging system 220 associated with the location module 210. It should be appreciated that information associated with one or more of the location modules 210, its assignments, and/or similar configurations may be recorded or otherwise stored to the data repository 400, or other storage medium accessible to at least the data repository 400. This information may be accessed by the mapping application system, e.g., upon scanning or otherwise reading the identifier corresponding to the location module 210 or tagging system 220. Additionally, or alternatively, upon scanning the identifier, the data repository 400 may be operably configured to push the information, e.g., metadata, to the traveler device 110. Additionally, or alternatively, the data repository 400 may be configured to restrict data from being pushed to the data repository 400, e.g., as a security measure.

In yet a further exemplary embodiment, the tagging system 220 metadata may include, e.g., identification information corresponding to the location module 210, e.g., a type of location module 210: a streetlight, where the streetlight may be located: intersection of Main Street and Hill Road. Additionally or alternatively, the tagging system 220 metadata may include additional identification information corresponding to the traveler 204. Examples of the additional identification may include the traveler's 204 name: John D., the additional selection for the traveler 204: partially-sighted, a current status for the traveler 204 along the route: John D. has interfaced with tagging system 220 at 9:00 AM and is traveling north along route XYZ.

It should be appreciated that the traveler 204 information may be provided or otherwise accessible to the user control system 300 upon the user control system 300 interfacing with the tagging system 220, e.g., via interaction of the traveler device 110's NFC or other wired or wireless system with interfacing capabilities with the tagging system 220. Additionally or alternatively, the NFC or similar interfacing system may include a memory which may include some of the location metadata for identifying the traveler's location.

In yet a further exemplary embodiment, and because most beaconing and tagging technologies do not present their respective data in identical or similar formats, the administrator control system 200 may be operably configured to translate or otherwise modify data from the various beaconing and/or tagging technologies into, e.g., a unified data that may be compatible with and accessible to the various devices, modules, and systems within the location-based navigation system 100, e.g., the tagging system 220, the administrator control system 200, and/or the data repository 400, and/or any subsystems, e.g., the mapping application system.

With continued reference to the figures, the mapping application system of the administrator control system 200 may be operably configured to provide map details to the user control system 300. The map details may include an above or below ground map of a geographic region having one or more travel routes. The mapping application system may further be configured to provide mapping capabilities to facilitate the transmission of location information associated with the managed area 212 to the traveler 204 within the managed area 212. The mapping capabilities may include, e.g., generating or otherwise providing at least the above and below ground mapping details corresponding to the managed area 212.

Additionally or alternatively, the administrator control system 200 may identify and/or include one or more location modules 210 selectively placed or otherwise distributed within the managed area 212. The location modules 210 may be under the control of one or more administrators of the managed area 212, e.g., municipality administrators tasked to provide map details and location module information. The location module 210 may be a managed physical location or conveyance or associated with the managed physical location or conveyance and includes location information associated with the location of the location module 210. It should be appreciated that the terms location and conveyance, as used herein may be used interchangeably and refers to any physical location of interest to administrators of the managed area 212, e.g., a municipality.

As shown in FIG. 2A, the managed area 212 may include a plurality of location modules 210 which may be selectively placed throughout the managed area 212. The location modules 210 may be associated with stationary objects (e.g., a mailbox as shown in FIG. 2A), or in some embodiments, with movable objects (e.g., an automobile as shown in FIG. 2B). The stationary object may be a managed physical location, which may be managed by a third party, e.g., a municipality and/or private entity. The stationary objects may also include streetlights (FIG. 2B), parking meters, and/or light posts within the managed area 212. The movable objects may also include buses, subways, trolleys, ferries, or other moveable objects and/or vehicles configurable to include location information corresponding with the movable object. The location information of the movable object may include routes assigned or otherwise tasked for the movable object, and/or scheduling associated with the movable object. It should be appreciated that the location information for the moveable object may be communicated to the traveler device 110 via the tagging system, and/or another identifier or other indicia capable of providing location information to the traveler device 110.

In yet a further exemplary embodiment, the user control system 300 may include a natural language processing system (NLP) operably configured to present or otherwise provide travel related information to the traveler as audible or textual information. The NLP may be comprised in software or hardware, e.g., in a controller or server, and may be configured to provide map details or similar location information corresponding to the traveler's 204 travel preferences e.g. as audible information to visually impaired travelers. The information may be provided to the traveler 204, e.g., via the traveler device 110, in lieu of the map details or location information, or in addition to any maps, map details, or location information that may be visually displayed via the navigation application provided on the traveler device 110.

In an exemplary embodiment where the NLP is comprised in software, the NLP may reside in memory or a storage medium on the traveler device 110, or other device of the location-based navigation system 100, e.g., administrator control system 200, and may be executed via one or more processors from the traveler device 110, the administrator control system 200 or remote server, e.g., the data repository 400.

In an exemplary embodiment where the NLP is comprised in hardware, the NLP may include at least a processor in signal communication with a memory, a network interface device, and a storage component/device. The processor may be operable to execute a plurality of language instructions for presenting or otherwise providing route information and/or map details to the traveler as audible information via one or more speakers operably connected to the traveler device 110. It should be appreciated that the audible information may be communicated to the traveler by any means known in the art for conveying audible information (e.g. headphones, headsets, bone conduction headphones). It should further be appreciated that the route information may be provided in any language desired by the traveler, e.g., the traveler's native language or a language corresponding to the managed area 212.

Additionally, or alternatively, the processor may be operable to execute instructions for presenting or otherwise displaying route information and/or map details to the traveler via one or more displays operably connected to the traveler device 110. In some embodiments, the display may be the traveler device 110 display.

In some embodiments, the audible and/or textual information presented in lieu of or with any maps, map details, or location information may be provided to the traveler 204 via an accommodation means. The accommodation means may be determined via the NLP or similar system for accommodating the traveler 204 based on the traveler's 204 impairment or other preference.

In an embodiment where the impairment is a visual impairment, the accommodation means may be one or more audible commands. Additionally, or alternatively, where the impairment is a hearing impairment, the accommodation means may be one or more visual commands. The audible and/or visual commands may be associated with the various systems in the managed area 212, e.g., the location module 210 and/or the tagging system 220. Delivery of the audible and/or visual commands may be via a delivery means, e.g., the traveler device 110, or a similar system operably configured to deliver map details and/or route information to the traveler 204 based on the traveler's impairment or preference. For example, the delivery means may be one or more speakers for broadcasting audible commands for visually impaired travelers, and a display for displaying textual information for hearing impaired travelers.

Additionally or alternatively, the NLP may be configured to identify the traveler's 204 travel information, e.g., the starting point, destination or other route information, e.g., travel context, via the navigation application or the navigation application's metadata. Upon identifying the traveler's 204 travel information, including travel context, the NLP may generate an NLP list that may include at least the travel information including the travel context, e.g., any impairments of the traveler 204 or the mode of transportation the traveler 204 wishes to utilize along the route or path 214. The NLP may then initiate, e.g., its audible language processor, if the travel context identified in the NLP list corresponds to a visual impairment. Upon identifying the traveler's 204 impairment, e.g., the NLP may associate one or more commands included in the NLP and corresponding to the traveler's spoken or preferred language to the route information provided in the NLP list, and subsequently deliver or otherwise provide the one or more commands to the traveler 204 as audible or visual instructions.

In yet a further exemplary embodiment, the NLP may be configured to function as an interactive interface to the mapping application system for providing the traveler 204 the capability to speak to the mapping application system. Utilizing this functionality, the traveler 204 may request to begin a trip or request information about, e.g., a location provided via the data repository 400, or a location based on questions directed to the mapping application system, e.g., where is the nearest pizza place? It should be appreciated that the requested information may be provided to the traveler 204 via the mapping application system, visually and/or in audible, and based on the traveler's 204 impairment and/or preferences.

Additionally or alternatively, the NLP may be configured to continue developing or updating the NLP list based on a travel history for the traveler 204. The travel history may be provided via metadata accessible to the NLP, e.g., the navigation application metadata, and/or metadata from one or more of the other systems, devices or modules within the location-based navigation system 100, e.g., the administrator control system 200, the user control system 300, the data repository 400, and/or the traveler device 110. The travel history may define or otherwise provide travel patterns or additional information related to the traveler's 204 travel context and based on previous routes traveled by the traveler 204. Examples of the travel patterns may include the type of transportation utilized by the traveler 204 when going to a particular destination, the amount of stops between the traveler's 204 starting point and destination for specific routes. Additionally or alternatively, the travel patterns may identify waypoints or alternate routes travelled which may be identified based on metadata provided once the traveler's device interfaces with any tagging systems 220 along the waypoint route or alternate route.

Additionally or alternatively, the NLP may be configured to provide turn-by-turn directions in audible along the traveler's 204 route and based on the traveler's 204 location relative to the tagging system 220 and/or location module 210. Examples of the turn by turn directions may include "make a left turn 20 paces ahead at Paulding Avenue," when approaching Paulding Avenue, and "make a left turn now," once the traveler 204 scans or otherwise interfaces the traveler device 110 with the tagging system 220 at Paulding Avenue.

Additionally or alternatively, in lieu of or with spoken words provided by the NLP, the NLP may further be configured to deliver or otherwise provide various sounds, haptic feedback, or similar identifiers to the traveler 204, e.g., a beep and/or a horn, once the traveler 204 has arrived at the location module 210 or tagging system 220, and/or final destination. Additionally or alternatively, the NLP may be configured to present the location information to the traveler in real-time or near real-time and based on the NLP list or other information provided by the traveler 204, e.g., via the navigation application.

With continued reference to the figures, the location-based navigation system 100 may include an augmented reality module or system (ARS) in operable communication with one or more of the administrator control system 200, the user control system 300, and/or the navigation application. In one exemplary embodiment, the ARS may be configured to interface with or otherwise overlay one or more maps or map details provided to the traveler 204. The ARS may be configured to provide a visual emphasis of the navigation information, e.g., the path 214, provided to the traveler 204 to assist with travel along the path 214. In some embodiments, the accommodation means may be the overlay for providing route information to the traveler 204.

Additionally or alternatively, the ARS may further be configured to activate or otherwise initialize one or more map path markers, e.g., path highlighters or similar markers, which may overlay the route, path 214, and/or similar map details provided to the traveler 204. The highlighted path 214 may be provided as, e.g., an intelligent path, and with one or more path identifiers corresponding to specific map details to assist and/or guide travelers 204 with, e.g., a hearing or visual impairment. The highlighted path 214 may be presented to the traveler 204 as an updated version of a mapped location (i.e., an updated map of the managed area 212), or the highlighted path 214 may be presented or otherwise provided as an overlay, e.g., a direct map overlay, over the provided map or map details in, e.g., the navigation application, with highlights that may correspond to the path 214 to be travelled in managed area 212.

With continued reference to the figures, the location-based navigation system 100 may further include a payment module. The payment module may be in operable communication with one or more devices, systems, or modules in the location-based navigation system 100, e.g., the administrator control system 200, user control system 300, data repository 400, and/or traveler's device, and may be operably configured to transmit or otherwise apply one or more payments from the traveler's device, e.g., via the navigation application, to a payment processing entity, e.g., a municipality, transport company, and/or other entity tasked to receive and/or process payments related to travel services provided to the traveler 204, and as may be identified by the travel context.

It should be appreciated that the payment amounts that may be processed via the payment module may correspond to costs associated with travelling along the path 214 and as may be provided by the travel context. Data processed and transmitted via the payment module may be transmitted to the payment processing entity via one-way communication to better manage and otherwise protect any information (e.g., personal private data) not related to the payment transaction from being compromised. Additionally or alternatively, all payment related information may be encrypted and/or retained locally, e.g., in the traveler device 110 or navigation application, to further protect the traveler's 204 information from being compromised during any data transfer.

Additionally or alternatively, the payment module may be operably configured to interface with the traveler device 110's mobile payment or digital wallet technologies (e.g., Chase Pay®, Apple Pay®, Samsung Pay®) for processing payments via NFC or wireless technology in a secured manner. Leveraging these types of technologies may allow for the payment module to provide real-time or near real-time payments or proof of payments to transportation providers at a manned or unmanned station, e.g., a subway turnstile 211 (as shown in FIG. 2C), via the traveler's device. The payment module may further interface with the navigation application, e.g., in real-time or near real-time, to provide location updates for the traveler 204 along the path 214 and based on payments processed via the payment module. Processing payments via the payment module may result in the payment module generating payment module metadata including at least payment and location information that may be submitted to one or more of the devices, systems, modules, and/or applications in the location-based navigation system 100, e.g., the navigation application, to identify at least the traveler 204 location and/or payment related information. Additionally or alternatively, the payment module metadata may be used to compare current routes being travelled with alternate routes to determine whether the traveler 204 remains on the most optimal route based on their travel context, e.g., route preference. If a more optimal route exists, as will be described in more detail below, the payment module may present or otherwise provide updates in the travel costs to the traveler 204 based on the more optimal route.

Additionally or alternatively, payment historical data may be retained for subsequent use in processing the traveler's payment for travel services. In this exemplary embodiment, where a traveler 204 may access or travel on a particular route more than once, the payment module may include an autopay feature that access the payment historical data to obtain payment information for the desired route (traveled more than once) and may automatically transmit payment based on the payment historical data for current or future travel services using the same route. Additionally or alternatively, the payment module may be configured to use the payment historical data as a baseline payment for comparing the previous payment made for a particular route to a current payment schedule that may be supplied by the travel services provider or another party, and for determining an updated cost for travelling the route, and either approving the updated cost or submitting the updated cost for approval by the traveler 204. The payment module may further be configured to provide real-time or near real-time alternate routes for the traveler 204 to reach their desired destination and may update the travel cost to be paid based on previous payments as identified in the payment historical data as compared to the travel service costs associated with the alternate routes. In yet a further exemplary embodiment, the payment module may be configured to present one or more combination of route types based on the traveler's 204 route preferences. For example, the payment module may be configured to present only those routes that are less expensive than previous routes per the payment historical data to the traveler 204. Additionally or alternatively, the payment module may be configured to present routes based on the travel context, e.g., routes having less traffic, a shorter distance, or a combination of route types to the traveler 204 along with the associate payment and/or route duration.

In yet a further embodiment, the navigation application may be configured to interface or otherwise communicate with a safety system to provide emergency updates to the traveler 204 when traveling in the managed area 212. It should be appreciated that the emergency may be within the managed area 212 or proximate to the manage area 212 such that the traveler 204 may be in an area of concern for safety personnel. In an exemplary embodiment, the payment module may include metadata having location information to assist the traveler 204 and/or safety personnel, e.g., first responders, in emergency situations. The metadata with location information may be provided to the safety personnel, e.g., via the navigation application or other system, once an emergency is identified. For example, during an emergency, once a traveler 204 taps-in via the payment module at, e.g., the subway turnstile 211, first responders or other emergency personnel may be able to locate the traveler 204 based on activity identified via the payment module metadata, which may include, e.g., the location of the subway turnstile 211 at a point or period in time. From the metadata or other corresponding data, the first responders may be able to identify the location of the subway turnstile 211 and may determine the traveler's 204 location based on the current time (of the ongoing emergency) versus the payment module activity time at the subway turnstile 211 as provided in the metadata. Additionally or alternatively, during an emergency, first responders may communicate with the traveler 204 via the payment module or other module or application of the location-based navigation system 100, e.g., USC 300, by remotely activating an emergency command on the traveler device 110, which may alert the traveler 204 to the emergency and which may present a safe travel route to the traveler 204 as an alternate route with any associated costs in real-time or near real-time. It should be appreciated that the safety system may use metadata from other modules, applications, or systems within the location-based navigation system 100 in lieu of the payment module metadata or in conjunction with the payment module metadata to identify the traveler's 204 location and to provide safe passage, e.g., via a safe alternate route.

Figure 3:
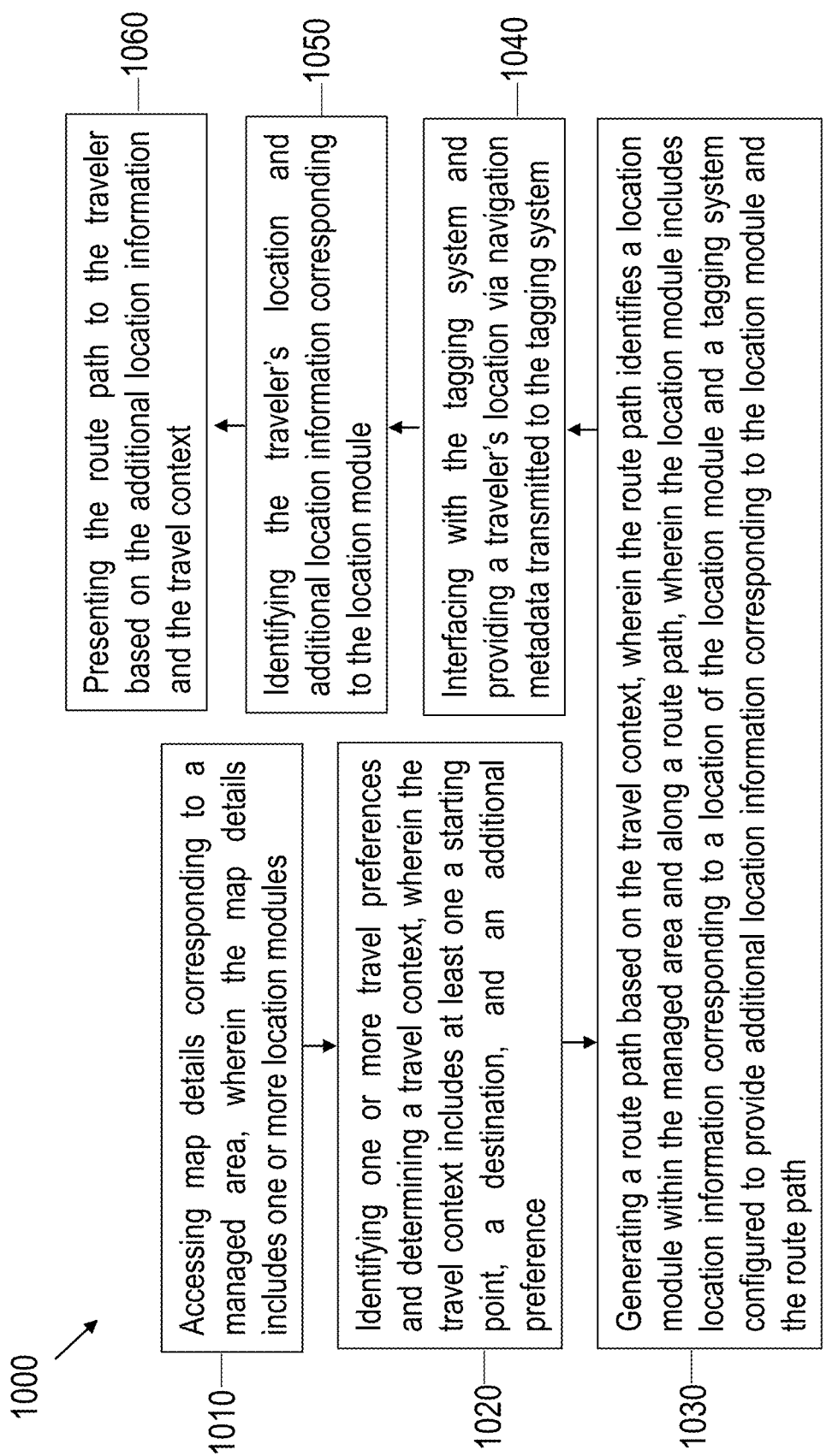
FIG. 3 illustrates a flowchart for an exemplary embodiment of a method in a navigation application in accordance with the disclosure provided herein.

With continued reference to the figures, and now with additional reference to FIG. 3, a method 1000 in a navigation application for identifying and presenting a path 214 within a managed area 212 is provided. It should be appreciated that the method 1000 may be performed in a different order, with illustrated steps omitted, with additional steps added, or with a combination of reordered, combined, omitted, or additional steps.

In step 1010, the navigation application accesses map details to present to a traveler 204 via the traveler device 110. In this step that navigation application may be operable configured to access map details from the administrator control system 200.

In step 1020, the navigation application may identify route information provided by the traveler 204 via the user interface of the navigation application or by information associated with the traveler device 110 and/or provided via one or more of the traveler device 110 systems, e.g., GPS. The route information may include a start location, a destination, and an additional preference or option specific to the traveler 204. It should be appreciated that the start location may be determined based on the traveler's 204 location, e.g., via GPS technologies, and without the traveler 204 entering the start location. Additionally or alternatively, the destination information may be automatically provided based on previous destination of the traveler 204, which may be accessed via historical data accessible to the navigation application. The additional preference specific to the traveler 204 may correspond to the traveler's 204 impairment, e.g., a hearing impairment, visual impairment, physical impairment, or any combination thereof. Upon identifying the route information, the navigation application may be configured to determine a travel context for the traveler 204. In some embodiments, the travel context may be based on the additional preference.

It should be appreciated that the traveler 204 may not be required to input the additional preference and/or any other traveler preferences (e.g., the route information). The additional preference and/or traveler preferences may be saved to historical data and later retrieved by the location-based navigation system 100, for example, as needed or otherwise requested by the traveler (e.g., via the navigation application) for determining the travel context.

In step 1030, the navigation application may generate a path 214 based on the travel context. The path 214 may identify one or more location modules 210 within the managed area 212 and along the path 214. Each of the identified location modules 210 may include location information corresponding to the location of the location module 210. Additionally or alternatively, each location module 210 may include a tagging system 220. The tagging system 220 may be configured to provide additional location information corresponding to the location module 210 and the path 214 to the traveler 204 upon the traveler 204 interfacing with the tagging system 220.

In step 1040, the navigation application may interface with the tagging system 220. In this step, interfacing with the tagging system 220 may be achieved by the traveler 204 via the navigation interface, and using, e.g., the traveler device 110's NFC or other wired and/or wireless functionality or camera functionality useful for communicating or interfacing with the tagging system 220. In this step, the traveler 204 may tap-in, scan a QR code, or place the traveler's device with activated navigation application at or proximate to the tagging system 220 for interfacing the traveler device 110 with the tagging system 220, and to submit traveler information to the tagging system 220, and/or other device, module, or system within the location-based navigation system 100.

In step 1050, the traveler information may be transmitted to an administrator control system 200, e.g., via navigation metadata, to identify the location module 210 associated with the tagging system 220 and to identify the traveler's location along the path 214 as it relates to the location of the location module 210. Upon identifying the traveler's location along the path 214, in step 1060, the path 214 may be presented to the traveler 204 (e.g., via the traveler device 110) based on the additional information and the travel context. In this step, the path 214 may include the map details and the identified location module 210 associated with the interface tagging system 220 along the path 214.

Additionally or alternatively, the path 214 may be presented to the traveler 204 with enhancements based on the traveler's 204 impairment, e.g., as identified by the additional preference selected or otherwise provided by the traveler 204, which may correspond to a preference and/or an impairment of the traveler 204, e.g., a visual impairment and/or a hearing impairment. In an example embodiment, the path 214 may presented to a traveler 204 with a hearing impairment by highlighting the path 214 on a map in a different color. In another example embodiment, the path 214 may be audibly relayed to the traveler 214 at the beginning of the trip.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the terms "comprising", "including", and "having", are open-ended and does not exclude other elements or steps; and the use of articles "a" or "an" does not exclude a plurality.

We claim:

1. A method for navigating for a traveler with an impairment, comprising:
    receiving route information, via a traveler device, wherein the route information includes a first location, a destination, and an additional selection corresponding to the impairment;
    identifying a route from the first location to the destination, and a location of a stationary location module along the route;
    determining a delivery means based on the additional selection, wherein the delivery means includes at least one accommodation associated with the additional selection;
    generating an accommodation means based on the route and the additional selection, wherein the accommodation means defines a path along the route, and wherein the path includes the location of the location module;
    receiving location information of the location of the traveler from the stationary location module located along the identified route in response to the traveler device traveling along the identified route and communicating with the stationary location module,
    determining the traveler device's current location using the received location information received from the stationary location module, and
    providing the accommodation means for navigation guidance along the path via the delivery means, the navigation guidance including the determined traveler device's current location.

2. The method of claim 1, wherein the additional selection corresponds to a hearing impairment and the accommodation is a display configured to display the path and the location of the stationary location module.

3. The method of claim 2, wherein the path is processed via an augmented reality module for visually enhancing one or more of the paths or the location of stationary location module, and wherein the path or the location of stationary location module is provided via the display with visual enhancements.

4. The method of claim 1 further comprising:
interfacing with the stationary location module to receive updated route information;
defining an updated path based on the updated route information;
updating the accommodation means; and
providing the updated accommodation means for navigation guidance along the updated path via the delivery means.

5. The method of claim 1, wherein the additional selection corresponds to a visual impairment and the accommodation is a device configured to audibly broadcast the path and the location of the stationary location module.

6. The method of claim 5, wherein generating the accommodation means further includes processing the defined path via a natural language system for converting path details to speech, and wherein the speech are broadcast via the device.

7. The method of claim 4, wherein interfacing with the stationary location module includes connecting a traveler device to the stationary location module via a wired or wireless system of the traveler device.

8. The method of claim 7, wherein the wired or wireless system includes an NFC system and interfacing with the stationary location module comprises:
tapping the stationary location module with a transceiver of the NFC system.

9. The method of claim 1 further comprising:
receiving payment information corresponding to costs associated with travel along the path and transmitting the payment information to a third-party provider via a payment system in communication with the navigation system.

10. The method of claim 9, wherein the payment system defines payment metadata, and wherein the payment metadata includes the payment information and location information for a traveler traveling along the path.

11. The method of claim 10 further comprising:
interfacing with a safety system to identify a proximate location of the traveler along the path, wherein the proximate location of the traveler along the path is based on the location information in the payment metadata.

12. A location-based navigation system for an impaired individual comprising:
a computer readable memory having a plurality of instructions for a navigation application stored thereon;
a processor in communication with the computer readable memory and configured to execute the plurality of instructions, via a traveler device, to perform the following:
receiving route information, via a traveler device in communication with the processor, wherein the route information includes a first location, a destination, and an additional selection corresponding to the impairment;
identifying a route from the first location to the destination, and a location of a stationary location module along the route;
determining a delivery means based on the additional selection, wherein the delivery means includes at least one accommodation associated with the additional selection;
generating an accommodation means based on the route and the additional selection, wherein the accommodation means defines a path along the route, and wherein the path includes the location of the location module;
receiving location information of the location of the traveler from the stationary location module located along the identified route in response to the traveler device traveling along the identified route and communicating with the stationary location module,
determining the traveler device's current location using the received location information received from the stationary location module; and
providing the accommodation means for navigation guidance along the path via the delivery means, the navigation guidance including the determined traveler device's current location.

13. The system of claim 12, wherein the additional selection corresponds to a visual impairment and the accommodation is a device configured to audibly broadcast the path, and the location of the stationary location module.

14. The system of claim 13, wherein the defined path includes path details, and wherein generating the accommodation means further includes processing the defined path via a natural language system for converting the path details to speech, and the speech is broadcast via the device.

15. The system of claim 12, wherein the additional selection corresponds to a hearing impairment and the accommodation is a display configured to display the path, and the location of the stationary location module.

16. The system of claim 15, wherein the accommodation means is an overlay, and wherein generating the overlay further includes processing the defined path via an augmented reality system for visually enhancing the defined path or the location of stationary location module, and wherein the defined path or the location of the location module is provided via the display with a visual enhancement.

17. A non-transitory computer readable medium comprising executable instructions for navigating for a traveler with an impairment, causing at least one computer processor to perform the following operation:
receiving route information, via a traveler device, wherein the route information includes a first location, a destination, and an additional selection corresponding to the impairment;
identifying a route from the first location to the destination, and a location of a stationary location module along the route;
determining a delivery means based on the additional selection, wherein the delivery means includes at least one accommodation associated with the additional selection;
generating an accommodation means based on the route and the additional selection, wherein the accommodation means defines a path along the route, and wherein the path includes the location of the location module;
receiving location information of the location of the traveler from the stationary location module located along the identified route in response to the traveler device traveling along the identified route and communicating with the stationary location module,
determining the traveler device's current location using the received location information received from the stationary location module; and
providing the accommodation means for navigation guidance along the path via the delivery means.

18. The method of claim 1, wherein
the additional selection includes impairment information on the traveler's impairment, the determining operation determines the delivery means based on the impairment information, the at least one accommodation compensates for an impairment identified in the impairment information, the generating operation generates the accommodation means based on the route and the impairment information, and the providing operation provides the accommodation means for navigation guidance along the path via the delivery means so that the navigation guidance is in a form that at least partly compensates for the traveler's impairment.

19. The method of claim 18, further comprising:
determining the traveler device's current location using
- the received location information received from the stationary location module, and
- location information from a WAN, a GAN, or GPS, thereby increasing the accuracy of the determination of the traveler device's current location.

20. The method of claim 18, further comprising:
transmitting the impairment information from the traveler device to the stationary location module, which transmits the impairment information as metadata to an administrator control system or a data repository.

* * * * *